United States Patent
Burick

(10) Patent No.: US 7,413,040 B2
(45) Date of Patent: Aug. 19, 2008

(54) ROBOT WITH REMOVABLE MOUNTING ELEMENTS

(75) Inventor: Thomas J. Burick, Youngwood, PA (US)

(73) Assignee: White Box Robotics, Inc., Pittsburgh, PA (US)

( * ) Notice: Subject to any disclaimer, the term of this patent is extended or adjusted under 35 U.S.C. 154(b) by 0 days.

(21) Appl. No.: 10/915,885

(22) Filed: Aug. 11, 2004

(65) Prior Publication Data

US 2005/0038564 A1 Feb. 17, 2005

Related U.S. Application Data

(60) Provisional application No. 60/520,548, filed on Nov. 14, 2003, provisional application No. 60/494,533, filed on Aug. 12, 2003.

(51) Int. Cl.
*B60K 1/00* (2006.01)
(52) U.S. Cl. .................................................. 180/65.1
(58) Field of Classification Search ................ 180/65.1, 180/901, 6.48, 6.5; 446/436, 437, 454, 457, 446/460, 468, 272, 291, 299; 463/43–47, 463/6; 191/12.2 A, 12.2 R, 12.4; 901/1; 340/825.72, 825.76
See application file for complete search history.

(56) References Cited

U.S. PATENT DOCUMENTS

| | | | |
|---|---|---|---|
| 3,648,408 A * | 3/1972 | Terzian et al. | 446/291 |
| 4,620,285 A | 10/1986 | Perdue | |
| 4,654,659 A * | 3/1987 | Kubo | 340/825.76 |
| 4,698,775 A | 10/1987 | Koch et al. | |
| 4,736,826 A | 4/1988 | White et al. | |
| 4,886,412 A | 12/1989 | Wooding et al. | |
| 5,073,749 A | 12/1991 | Kanayama | |
| 5,324,948 A * | 6/1994 | Dudar et al. | 250/379 |
| 5,358,568 A | 10/1994 | Okano et al. | |
| 5,413,454 A | 5/1995 | Movsesian | |
| 5,542,028 A | 7/1996 | Minami | |
| 5,570,990 A | 11/1996 | Bonora et al. | |
| 5,647,554 A | 7/1997 | Ikegami et al. | |
| 5,672,044 A | 9/1997 | Lemelson | |
| 5,936,240 A | 8/1999 | Dudar et al. | |
| 6,083,104 A * | 7/2000 | Choi | 463/6 |
| 6,443,543 B1 * | 9/2002 | Chiang | 312/223.3 |
| 6,481,560 B2 | 11/2002 | Kearney | |
| 6,507,773 B2 * | 1/2003 | Parker et al. | 700/258 |
| 6,594,551 B2 * | 7/2003 | McKinney et al. | 700/258 |
| 6,604,022 B2 * | 8/2003 | Parker et al. | 700/258 |
| 6,611,734 B2 * | 8/2003 | Parker et al. | 700/258 |
| 6,741,054 B2 * | 5/2004 | Koselka et al. | 318/445 |

\* cited by examiner

*Primary Examiner*—Lesley D. Morris
*Assistant Examiner*—Bridget Avery
(74) *Attorney, Agent, or Firm*—The Webb Law Firm

(57) ABSTRACT

A hobby robot having a support structure includes a cavity defined within the support structure, wherein the cavity includes means positioned within the cavity for removably coupling at least one mounting element to an interior portion of the cavity. The support structure also includes means for securing an encasement shell to the support structure. The mounting element may be a tray or hardware that performs a desired function in connection with the operation of the robot. The support structure is adapted to receive a self-contained power source and means for imparting motive force to the support structure.

21 Claims, 6 Drawing Sheets

ROBOT WITH REMOVABLE MOUNTING ELEMENTS

CROSS REFERENCE TO RELATED APPLICATIONS

This application claims the benefit of U.S. Provisional Patent Application No. 60/494,533 filed Aug. 12, 2003, entitled "Robotic Platform" and U.S. Provisional Patent Application No. 60/520,548, filed Nov. 14, 2003, entitled "Robotic Platform With Removable Drive And Accessory Cage" the contents of both of which are incorporated herein by reference.

BACKGROUND OF THE INVENTION

1. Field of the Invention

The present invention is directed to a hobby robot and, more specifically, to a support structure for use with the hobby robot.

2. Description of Related Art

Building a robot from scratch is an excellent way to learn a lot about robotics, but is not the only way to get started. A robot kit that includes a pre-fabricated platform or support structure, motor, wheels, etc. can assist a builder through the initial learning curve and save a builder time, frustration and money, so that the builder can more quickly enter the programming or customizing aspects of robotics.

Currently, manufactured robotic platforms are extremely crude, garage-built, proprietary units, as currently no build standards exist in the field of robotic platforms. In terms of existing commercial robotic platforms, a fixed-shelf approach is utilized for mounting hardware and related peripherals to the robot. Although the fixed-shelf approach is appropriate for containing the hardware and related peripherals on the actual robot during actual use of the robot, the fixed-shelf approach is not conducive to continued upgrades or modifications that a builder may perform on the robot. Namely, replacing or modifying a specific piece of hardware may require the temporary removal of other hardware in order to provide manageable access to that specific piece of hardware. In the robotics field, especially during the initial build and testing process, hardware and peripherals may need to be constantly replaced or modified until an intended function of the robot operates satisfactorily. With each such replacement or modification attempt, it is usually the case that the temporarily removed hardware is thereafter reattached and/or reconnected so that the robot can be tested to determine the degree of success of the replacement or modification attempt. The aforementioned process may occur repeatedly during the course of an initial build or at a later time when only modifications are made to an existing hardware and peripheral configuration of the robot. The removal of hardware only for the purposes of accessing other hardware adds unproductive time to the build or modification process. This may result in added frustration on the part of the builder, as he or she may already be frustrated due to the fact that a certain intended aspect of building or modification is not proceeding or performing as intended.

It is, therefore, desirable to overcome the above problems and others by providing a robotic platform or support structure that allows a builder to efficiently build and modify a robot.

SUMMARY OF THE INVENTION

Accordingly, I have invented a hobby robot having an encasement shell surrounding a support structure. The structure includes a cavity defined within the support structure, wherein the cavity includes fasteners or functional equivalents positioned within the cavity for removably coupling at least one mounting element to an interior portion of the cavity. The support structure also includes fasteners for securing an encasement shell to the support structure. The mounting element may be a tray or hardware that performs a desired function in connection with the operation of the robot. The support structure is adapted to receive a self-contained power source and wheels or treads for imparting motive force to the support structure.

The support structure is modeled after current industry standard personal computing cases. Utilizing a familiar existing standard allows various standard-sized hardware and peripherals to be quickly and easily associated with and secured to the support structure. The flexibility of building and modifying hardware that is inherent in standard personal computing cases is now available to hobbyists and researchers to easily mount and remove almost any hardware and peripheral to the support structure in a similar manner. Specifically, the support structure allows for removable, adaptable, and relocatable mounting elements, such as trays or shelves, to be installed on the support structure.

In conjunction with encasement shells, the robot appears as a highly finished, professionally engineered, and an aesthetically appealing robotic platform, as opposed to a make-shift home made platform of significantly lesser engineering quality and cosmetic appeal. Furthermore, the present invention solves the problem of hobbyists, researchers, etc., having to build their own robotic platform. The inventive robotic platform also avoids the need for the builder to secure outside assistance from, for example, engineers and metal fabricators, and the costs associated therewith. The inventive robotic platform is a simple out-of-the-box solution that provides an inexpensive and accurate alternative to building a home made robotic platform.

Still other desirable features of the invention will become apparent to those of ordinary skill in the art upon reading and understanding the following detailed description, taken with the accompanying drawings, wherein like reference numerals represent like elements throughout.

DESCRIPTION OF THE PREFERRED EMBODIMENTS

Figure 1:
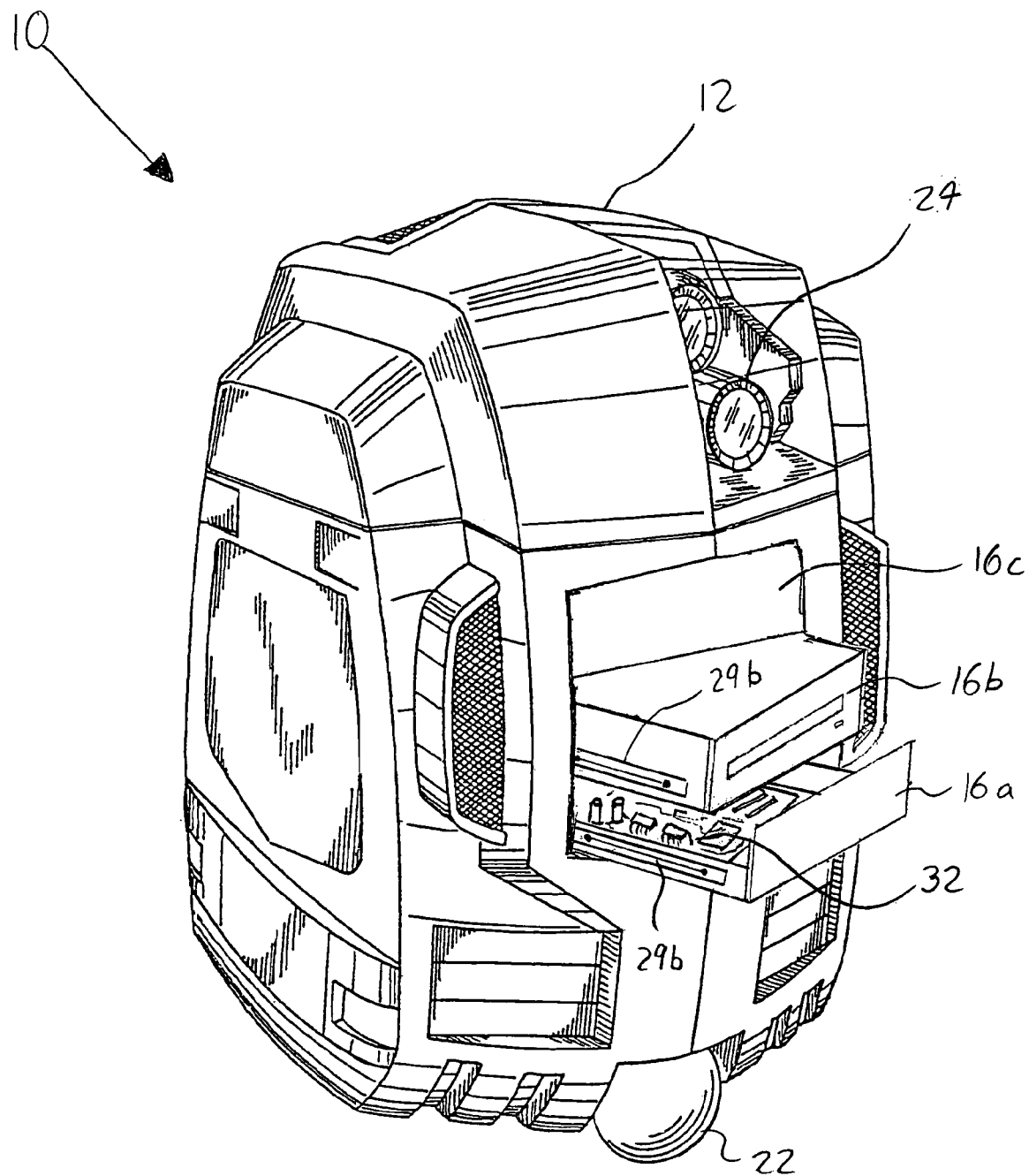
FIG. 1 is a front perspective view of a robot having an encasement shell with mounting elements protruding therefrom, in accordance with the present invention.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific apparatus illustrated in the attached drawings, and described in the following specification, is simply an exemplary embodiment of the invention. Hence, specific dimensions and other physical characteristics related to the embodiments disclosed herein are not to be considered as limiting.

Figure 2:
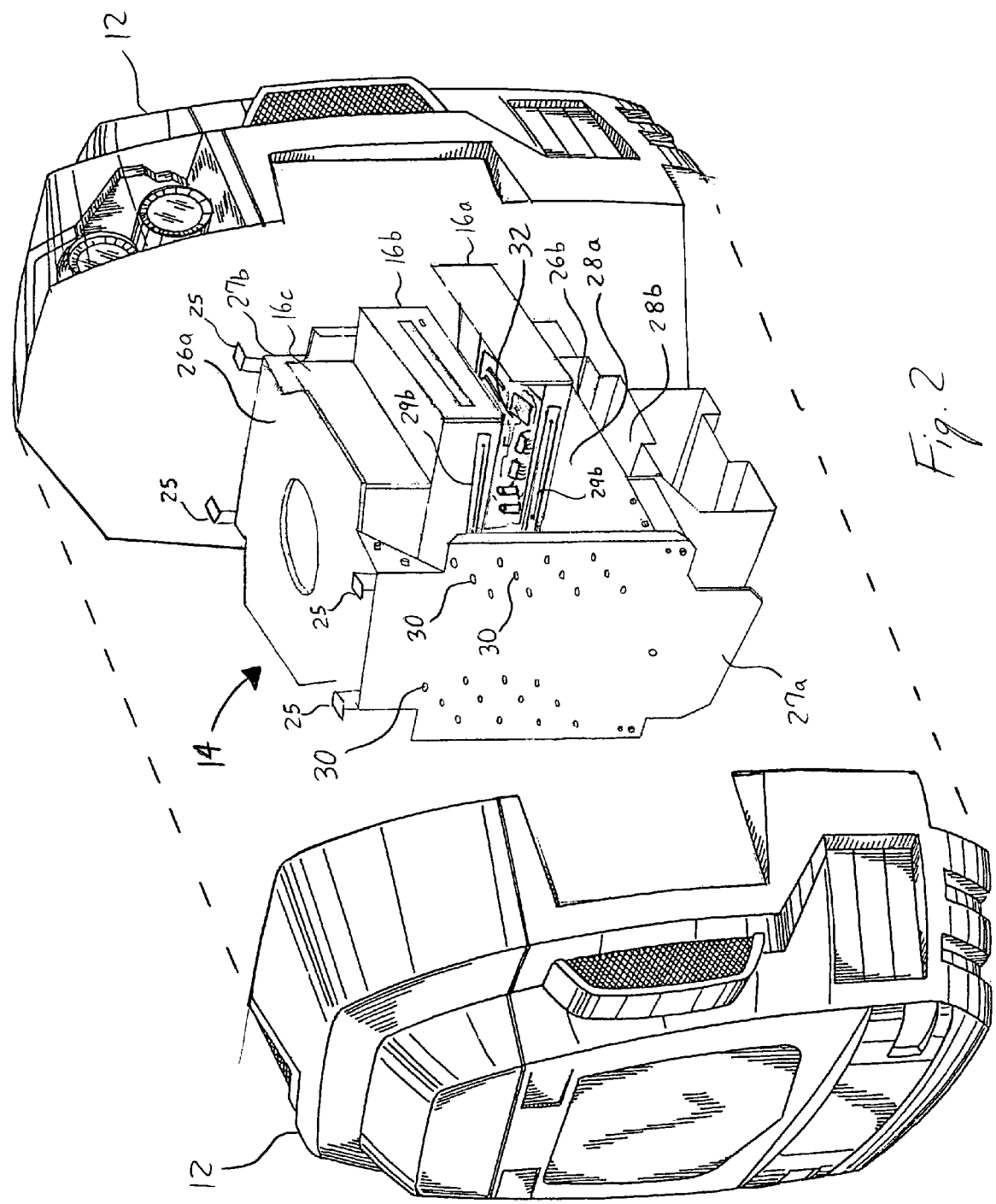
FIG. 2 is a perspective exploded view showing a support structure within the encasement shell supporting the mounting elements shown in FIG. 1.
Figure 3:
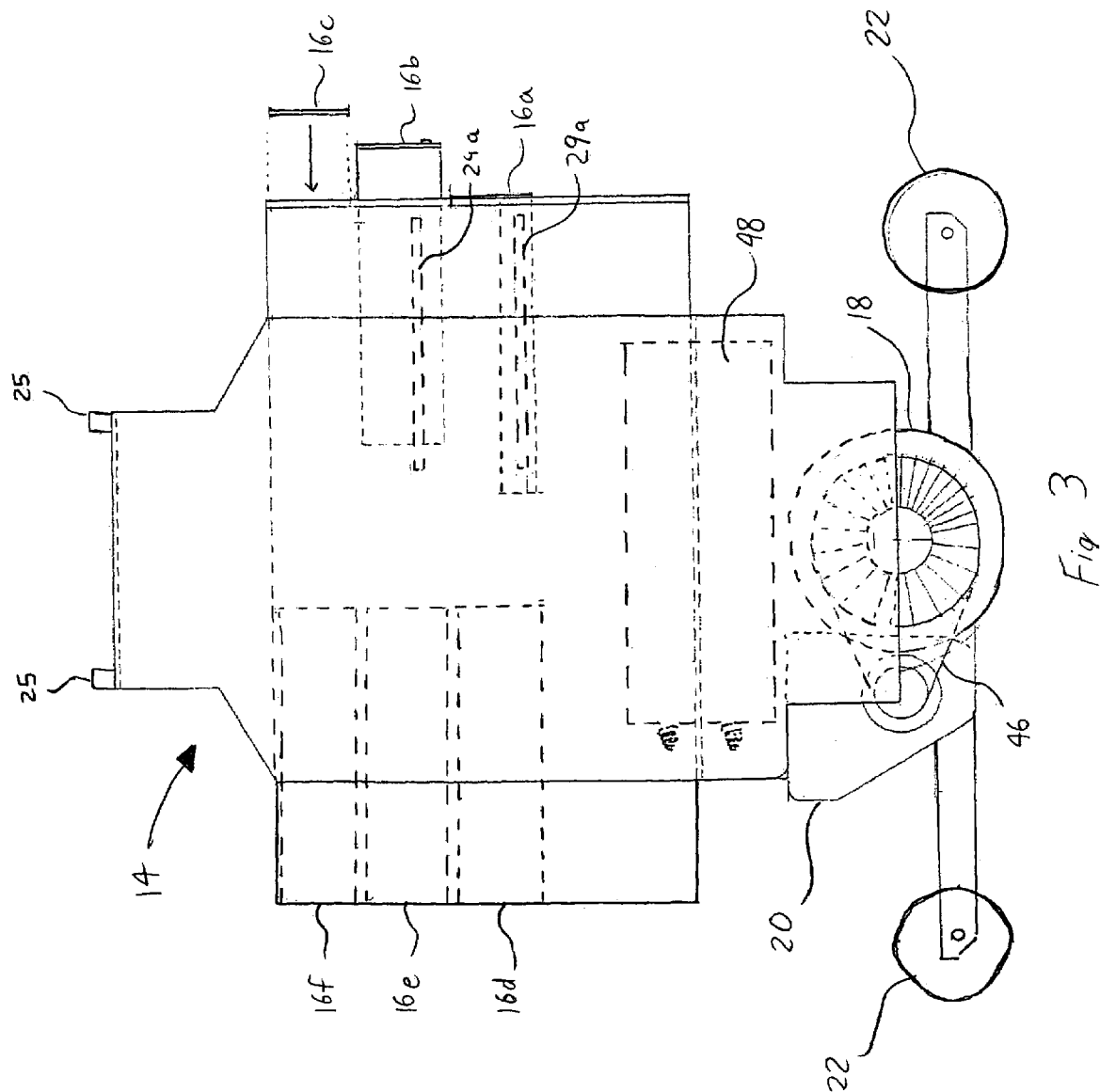
FIG. 3 is a side view of the robot of FIG. 1 showing the mounting elements partially in phantom in relation to the support structure.

FIGS. 1-3 depicts an exemplary embodiment of the present invention. Specifically, FIG. 1 depicts an exterior of a robot 10, such as a hobby robot, having an encasement shell 12. As shown in FIG. 2, the encasement shell 12 encloses a support structure 14, which in turn supports various mounting elements 16a-c. FIG. 3 depicts an exemplary embodiment of imparting motive force to the support structure 14, namely, a drive wheel 18 in communication with a motor 20. Additionally, support wheels 22 may be integrated into the support structure 14 to provide balancing functions. The robot 10 in FIGS. 1 & 2 is shown from a front perspective view, although it should be understood that the hidden rear view may be similar to the front view, depending on the configuration of the robot 10. Therefore, the designations "front" and "rear" for the robot 10, are used only in relation to how the robot 10 appears oriented in the drawings. It is to be understood that in operation, the robot 10 the front and rear of the robot may be reversed depending on the movement of the robot in relation to the builder or user.

With specific reference to FIGS. 1 & 2, the encasement shell 12 may serve as a protective encasement for the robot 10. Thus, any sensitive hardware or peripherals within the robot 10 are protected from unauthorized access and environmental elements or contamination. Additionally, the encasement shell 12 provides an aesthetic appeal to outside observers, as the hardware or peripherals and associated wiring and electrical components are concealed behind the encasement shell 12. Desirably, the encasement shell 12 is formed from plastic or fiberglass. However, it is to be understood that any suitable material may be utilized. The encasement shell 12 may be customized to allow for additional functionality of the robot 10. For example, a portion of the encasement shell 12 may be constructed of a non-opaque substance, such as clear glass, to allow a camera 24 to view the operating environment of the robot 10 while protected within the encasement shell 12. Furthermore, the encasement shell 12 may be configured to allow sensors and other hardware to be mounted thereon. Other hardware may include, but is not limited to light(s), vent(s), LCD panel(s), audio speaker(s), microphone(s), etc. Additionally, the encasement shell 12 may include cut-outs or punch-outs that may be optionally utilized to house and access components during the building of the robot 10. Alternatively, the encasement shell 12 may be fully enclosed, thereby requiring the builder to remove the encasement shell from the support structure 14 to access the internal components of the robot 10. Desirably, the encasement shell 12 is constructed of two or more panels that may be separated from either one another to form the support structure 12, thereby allowing access to the hardware and peripherals inside the robot 10. It is to be understood that the encasement shell 12 may alternatively be of a unitary design. It is envisioned that such a unitary design would provide a hinge mechanism for allowing access to the support structure 12. The encasement shell 12 may be secured to the support structure in various ways including, but not limited to a snap fit, friction fit, screwing, bolting, fastening, etc. For example, a plurality of hooks 25 arranged on the support structure 14 may engage interior portions of the encasement shell 12. Desirably, the encasement shell 12 is constructed to provide a compatible fit with the support structure 14 and any other components of the robot 10. For example, as shown in FIG. 1, the encasement shell 12 is molded to provide a sufficient opening for free movement of the support wheels 22. Furthermore, although not explicitly shown in the figures, a bottom portion of the encasement shell 12 is adapted to allow the drive wheel 18 to extend therethrough. Sufficient ground clearance is provided by the encasement shell 12 to allow uninhibited moment of the assembled robot 10.

The support structure 14 is adapted to receive various mounting elements 16a-c and other hardware or peripherals that may be associated with the operation of the robot 10. Desirably, the support structure 14 is modeled after current industry standard personal computing cases, as such cases include configurations conducive to receiving hardware and peripherals utilized in robot construction. For example, current personal computing cases are basically a framed metallic structure that includes predrilled screw holes, and vertical and horizontal cross-members for supporting computer related components. However, although existing personal computing cases may be used, it is to be understood that support structure 14 may be fabricated and implemented to provide a desired degree of configurability in the design of the robot 10. Desirably, the support structure 14 is formed from sheet aluminum and stamped steel, however, it is to be understood that any suitable material may be utilized. It is also desirable that the support structure 14 be sufficiently rigid to support the intended hardware and peripherals, yet not be too heavy to negatively impact the overall weight considerations in the design of the robot. The support structure 14 may be manufactured using the same processes that are utilized in the manufacture of personal computing cases. Desirably, the support structure 14 is constructed of various substantially horizontal and vertical members, such as members 26a, 26b and 27a, 27b, respectively, joined in a frame-like configuration. It is to be understood that the frame or frame-like configuration of the support structure 14 depicted in the figures is only an exemplary embodiment and may be substituted with other frame configurations depending on the needs of the builder and/or the specific application of the robot 10.

Desirably, builders in the field of robotics may utilize current off-the-shelf computer hardware and peripherals in the design of robots. Such hardware and peripherals include, but are not limited to mother/daughter boards (with associated computer components such as memory, processors, riser cards, etc.), data storage (hard disk drives, optical drives, media reader, non-volatile/volatile memory, etc), and miscellaneous optional components intended for increasing the functionality or aesthetic nature (slide rails, speaker system, I/O interface, rack mounts, riser cards, face plates, etc.)

The support structure 14 may be configured to receive one or more of the aforementioned hardware or peripherals. Specifically, the support structure 14 includes various cavities or bays, such as bays 28a and 28b, for supporting various mounting elements. Desirably, each cavity or bay is substantially rectilinear in shape, however it is to be understood that each cavity or bay may be shaped to suitably accommodate the corresponding shape of the mounting elements to be supported therein. The bays 28a and 28b are bounded by various horizontal and vertical members of the support structure 14. For example, bay 28a is bounded by the horizontal members 26a, 26b, and the vertical members 27a and 27b. Desirably, the bays 28a and 28b are sized to accommodate various off-the-shelf computer hardware and software. For example, bay 28a may have an industry-standard width of 5¼" to accommodate an optical drive, whereas bay 28b may be have an industry-standard width of 3½" to accommodate a floppy disk or a hard drive. With specific reference to FIGS. 1 & 2, the builder may utilize a tray, an optical drive, and a face plate, depicted as mounting elements 16a, 16b, and 16c, respectively, to be received within the bay 28a. It is to be understood that the arrangement of the mounting elements 16a-c shown in FIGS. 1-3 is for exemplary purposes only. Thus, the arrangement of the mounting elements 16a-c is dictated by the builder and/or needs of the robot 10. It is also to be understood that for the purpose of clarity, the necessary cables and specific electrical connections to and from the hardware and peripherals are not depicted in the figures.

As shown in FIGS. 1-3, the mounting elements 16a-c may be removably attached to the support structure 14. Specifically, lateral ends of each of the mounting elements 16a-c are attached to the substantially parallel vertical members 27a, 27b so that the mounting elements 16a-c span the width of the bay 28a. The tray 16a and the optical drive 16b may be attached directly to the vertical members 27a, 27b via screws or other suitable fasteners threaded into pre-drilled holes 30. The tray 16a may be adapted to receive a circuit board, such as a daughterboard 32, or other component to which constant modifications may be made during the course of building and testing the robot 10. Alternatively, the daughterboard 32 may be directly secured within the bay 28a if the daughterboard 32 is configured as a rack mount. Desirably, the face plate 16c is utilized to cover an area of the bay 28a which is not utilized by any component, and therefore provide a cosmetic covering for the empty area. Specifically, the face place 16c may be attached to the vertical members 27a, 27b by a snap-fit, friction fit, or other attachment mechanism. In this particular embodiment, the builder has already selected a suitable removable media storage device (i.e., CD-ROM), and therefore, a floppy disk may not be necessary. Hence, a hard drive (not shown) may be installed in the bay 28b. The present invention may include slide rail attachments having corresponding connectors 29a, 29b attached to the bay 28a and one or more of the mounting elements 16a-c, respectively. The slide rail attachments allow the mounting elements 16a-c to easily slide in and out of the bay 28a. The installation and operation of slide rail attachments and functional equivalents are known in the art and will not be specifically discussed herein. Even though the robot 10 has the encasement shell 12 installed, the mounting elements 16a-c may be partially removed to protrude beyond the encasement shell 12, as shown in FIG. 1 or may be completely removed. As shown in FIG. 3, the support structure 14 may support mounting elements in addition to mounting elements 16a-c. For example, mounting elements 16d-f may be mounted in the rear of the robot 10. Due to the highly configurable aspect of the support structure 14, the mounting elements 16a-f may be positioned in any suitable arrangement. For example, the mounting element 16f may be interchanged with the face plate 16c.

Figure 4:
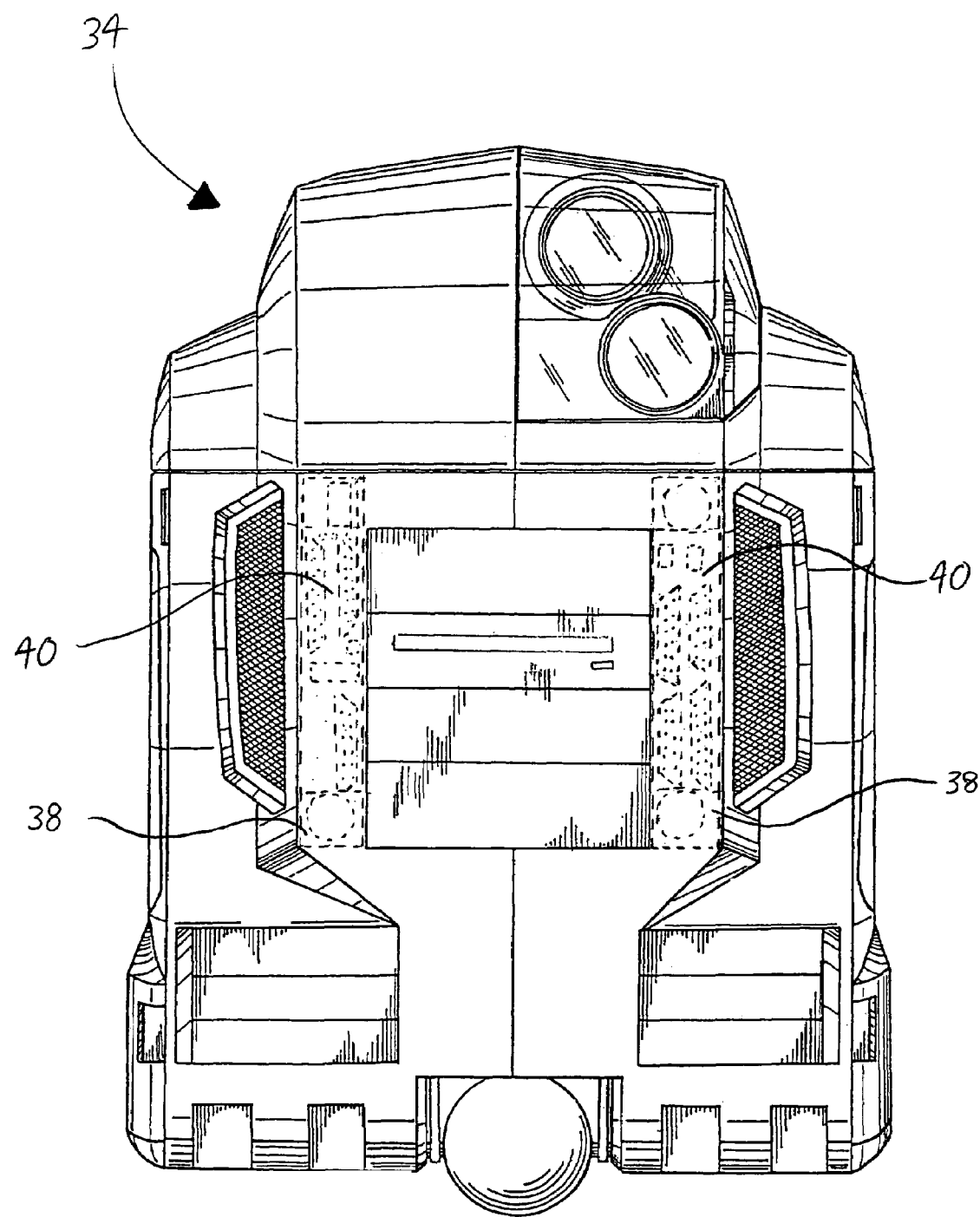
FIG. 4 is a front view of a first alternative embodiment robot having circuit boards shown in phantom attached to the support structure.
Figure 5:
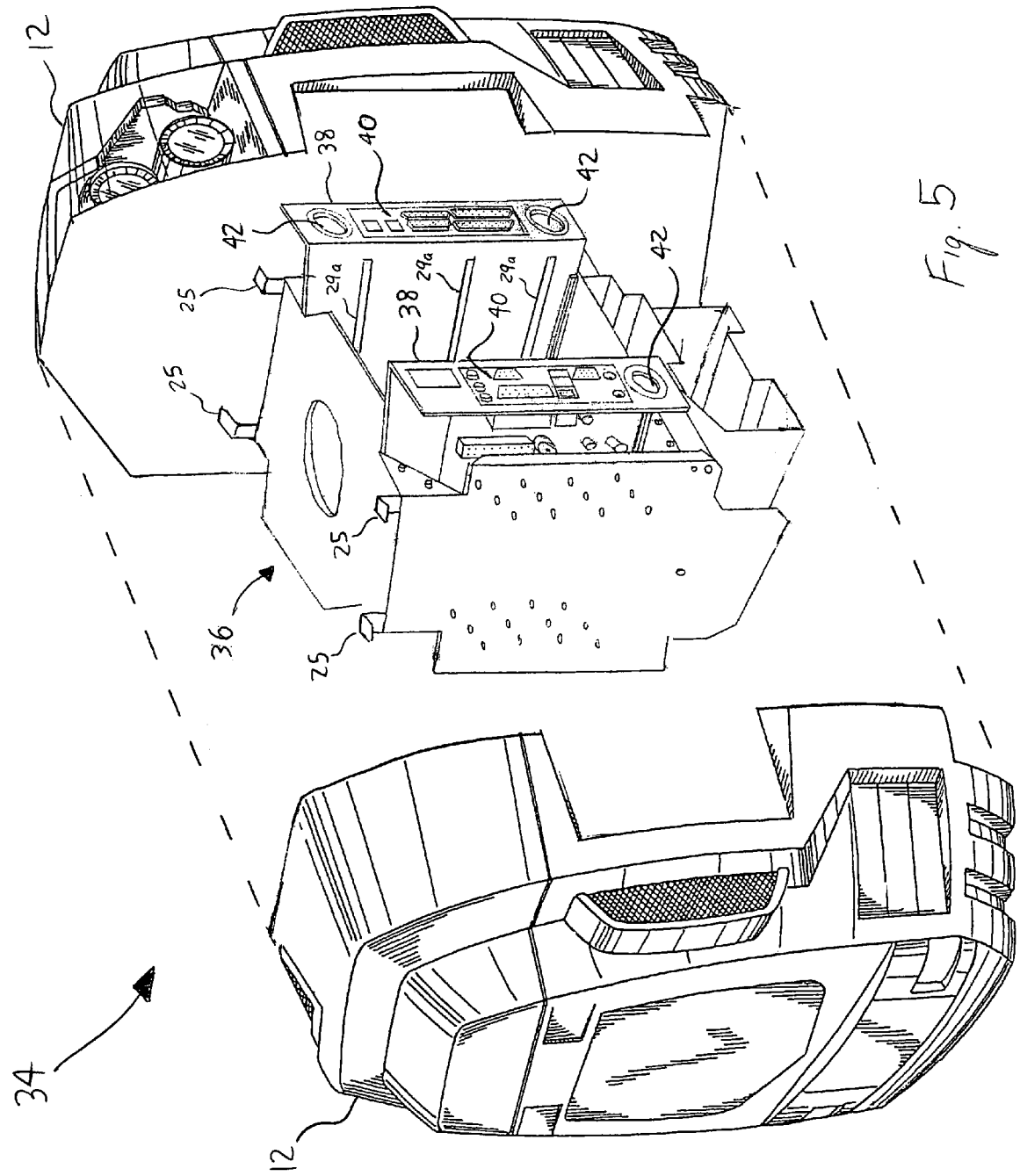
FIG. 5 is an exploded view of the first alternative embodiment robot of FIG. 4, showing the support structure within the encasement shell supporting the circuit boards.

With reference to FIGS. 4 & 5, and with continuing reference to FIGS. 1-3, a first alternative embodiment robot 34 is shown. The first alternative embodiment robot 34 is of similar construction as robot 10 except for the configuration of a support structure 36. Namely, the support structure 36 is constructed of cut-outs portions 38 for supporting circuit boards, such as motherboards 40, therein. Thus, the motherboards 40 can easily be accessed, removed, and replaced, simply by sliding them in and out of the cut-out portions 38 of the support structure. The cut-out portions 38 may also include cable management holes 42 for routing cables and wiring therethrough. It is to be understood that the cut-out portions 38 may also be integrated into robot 10 to provide even greater configurability and building efficiency in the robot 10. Furthermore, slide rail attachments having corresponding connectors 29a, 29b may also be utilized in connection with the first alternative embodiment robot 34.

Figure 6:
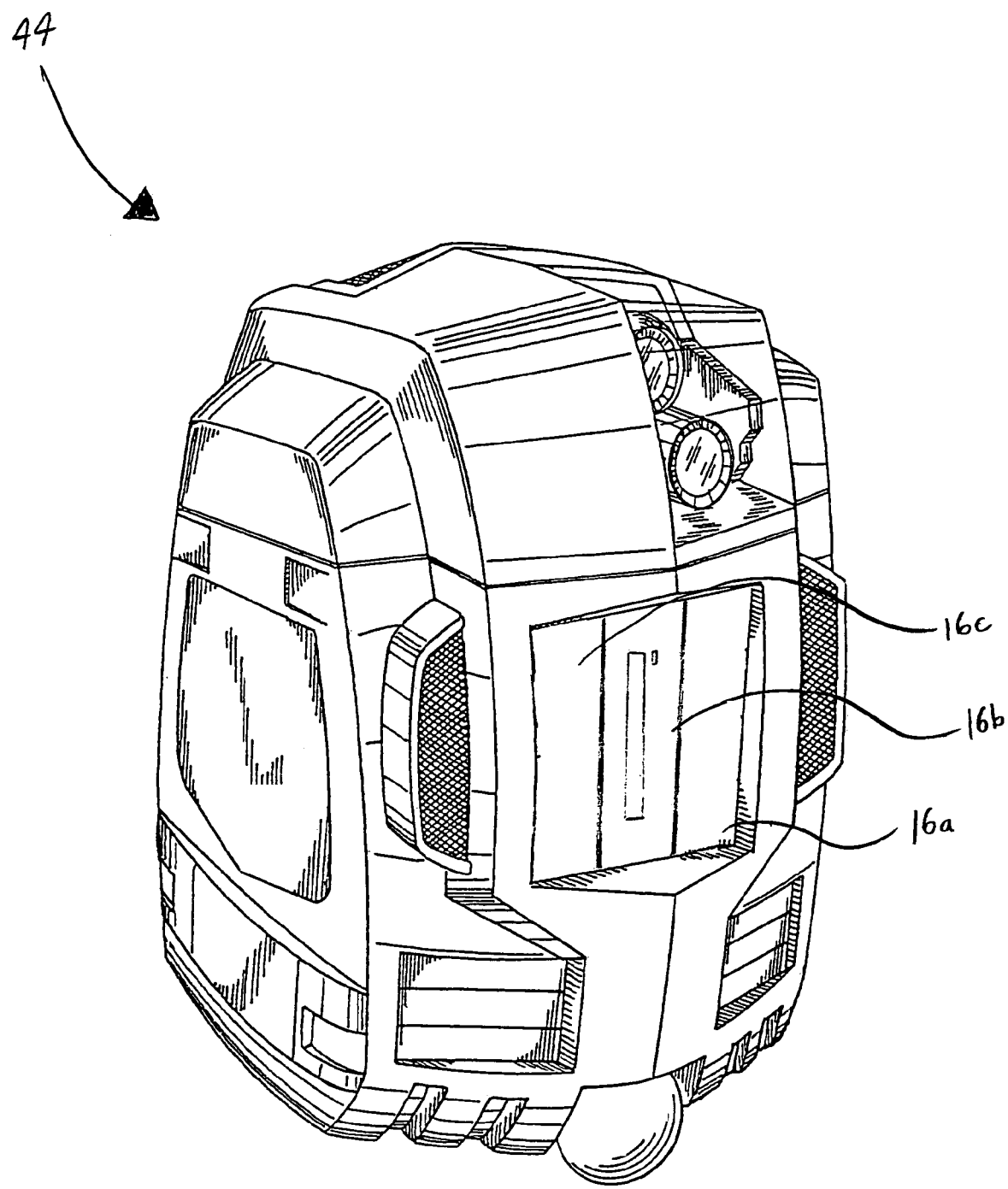
FIG. 6 is a front perspective view of a second alternative embodiment robot having the mounting elements of FIG. 1 oriented vertically.

With reference to FIG. 6, and with continuing reference to FIG. 4, a second alternative embodiment robot 44 is shown. The second alternative embodiment robot 44 is of similar construction as the robot 10 except for the arrangement of the mounting elements 16a-c. Specifically, the mounting elements 16a-c are mounted in a vertical orientation, as opposed to a horizontal orientation. Thus, the mounting elements 16a-c may be attached to the substantially parallel horizontal members 26a, 26b so that the mounting elements 16a-c span the height of the bay 28a. It is to be understood that the cut-out portions 38 shown in FIGS. 4 & 5 may also be integrated into robot 44 to provide even greater configurability and building efficiency in the robot 44. Furthermore, slide rail attachments having corresponding connectors 29a, 29b may also be utilized in connection with the second alternative embodiment robot 44.

It is intended that the robot 10, the first alternative embodiment robot 34, and the second alternative embodiment robot 44 each have a mechanism for imparting motive force to the support structure 14. With specific reference to the robot 10 in FIG. 3, the support structure is configured to support the drive wheel 18 and the support wheels 22. In this exemplary embodiment, the support wheels 22 provide stability and balance to the robot 10. The drive wheel 18 may be either directly or indirectly powered by the motor 20. For example, FIG. 3 depicts a drive belt 46 that transfers energy from the motor 20 to the drive wheel 18. This embodiment provides an accurate differential drive system with optical wheel encoders and motor driver circuitry. It is to be understood that the support structure 14 may be configured to support any suitable mechanism for imparting motive force. Furthermore, it is to be understood that the robot 10 may include, in addition or substitution to the wheels, treads that would allow the robot 10 to navigate terrain that may ordinarily be accessible to wheeled-only robots. The support structure 14 may be configured to receive a battery 48 for providing power to various components of the robot 10, including but not limited to the motor, the mounting elements, and the hardware and peripherals.

The present invention allows a builder to replace or modify a specific piece of hardware without requiring the builder to temporarily remove obstructive hardware that prevents effective access to the specific hardware that needs to be replaced or modified. For example, if the builder wishes to replace the optical drive 16b with a different component, the builder simply slides out the optical drive 16b from the bay 28a without having to remove any adjacent hardware. In this case, no adjacent hardware is required to be removed because no adjacent hardware is obstructing the removal of the optical drive 16b. In another example, if the builder wishes to access the daughterboard 32 and make changes thereto, the builder simply slides out the tray 16a without having to disturb other hardware. It is to be understood that if the encasement shell 12 does not include an opening from which the mounting elements 16a-c may be removed, that the mounting elements 16a-c may still be removed from the bay 28a after the encasement shell is removed from the robot 10. This embodiment may be desirable if a builder wants to prevent unauthorized access to and/or removal of the mounting elements 16a-c, which would otherwise be accessible through the opening of the encasement shell 12. In addition to providing efficient access to various hardware and peripherals, the support structure is conducive to cable management. Uncluttered cable arrangements not only allow the builder more room in which to work, but also aid in the efficient air flow critical to proper functioning of electrical components.

The invention has been described with reference to the desirable embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A hobby robot comprising:
   a support structure;
   an encasement shell surrounding the support structure;
   means for securing the encasement shell to the support structure;
   at least one cavity defined within the support structure, said cavity adapted to receive a plurality of computer drive bay peripherals;
   means positioned within the cavity for supporting said peripherals spaced from each other, wherein the positions of the peripherals supported by the means for supporting are interchangeable; and
   an opening situated in the encasement shell, said opening sized to accommodate the insertion and removal of the peripherals into the cavity through said opening, wherein the cavity and the opening are arranged to allow each peripheral to simultaneously be situated within the cavity while protruding through the opening.

2. The hobby robot of claim 1, wherein the cavity is adapted to receive each peripheral in either a substantially horizontal orientation or a substantially vertical orientation.

3. The hobby robot of claim 1, wherein at least one peripheral comprises at least one of the following: a circuit board, a hard disk drive, an optical drive, a media reader, non-volatile/volatile memory, a slide rail, a speaker system, an I/O interface, a rack mount, a riser card, and a face plate.

4. The hobby robot of claim 1, further including a tray supported by the support structure for supporting hardware that performs a desired function in connection with the operation of the robot.

5. The hobby robot of claim 1, further comprising a face plate for covering at least a portion of the cavity.

6. The hobby robot of claim 1, wherein at least one peripheral comprises a circuit board.

7. The hobby robot of claim 1, wherein the support structure is adapted to support a self-contained power source.

8. The hobby robot of claim 1, wherein the support structure is adapted to support means for imparting motive force to the support structure.

9. The hobby robot of claim 1, wherein:
   the cavity is substantially 5¼ inches wide to accommodate the peripherals; and
   each peripheral is an industry standard 5¼ inch personal computer drive bay peripheral.

10. The hobby robot of claim 4, wherein the tray is slidably received in the cavity.

11. The hobby robot of claim 8, wherein the means for imparting motive force includes a motor coupled to one of one or more drive wheels, one or more treads, or a combination thereof.

12. A hobby robot comprising:
    a support structure;
    a cavity defined within the support structure and having a width of substantially 5¼ inches;
    means positioned within the cavity for removably supporting a plurality of industry standard 5¼ inch personal computer drive bay peripherals spaced from each other in an interior of the cavity; and
    means for securing an encasement shell to the support structure.

13. The hobby robot of claim 12, further comprising an encasement shell for receiving the support structure therein.

14. The hobby robot of claim 12, further comprising means attached to the support structure for imparting motive force to the support structure.

15. The hobby robot of claim 12, wherein each peripheral is either in a substantially horizontal orientation or a substantially vertical orientation.

16. The hobby robot of claim 12, wherein the means for securing the encasement shell to the support structure is one of a snap fit, friction fit, screwing and bolting.

17. The hobby robot of claim 12, wherein the means for removably coupling the peripherals includes slide rails, screws, and/or fasteners.

18. The hobby robot of claim 12, wherein the cavity is substantially rectilinear.

19. The hobby robot of claim 12, wherein at least one peripheral comprises at least one of the following: a circuit board, a hard disk drive, an optical drive, a media reader, a speaker system, a slide rail, an I/O interface, a riser card, a rack mount, a tray, or a face plate.

20. The hobby robot of claim 14, wherein the means for imparting motive force to the support structure includes one of the following: one or more wheels, one or more treads, or a combination thereof attached to the support structure.

21. A method of customizing a hobby robot having an encasement shell surrounding a support structure that defines first and second mounting spaces within a cavity thereof, the method comprising:
    installing a first personal computer drive bay peripheral in the first mounting space via an opening in the encasement shell; and
    installing a second personal computer drive bay peripheral in the second mounting space via the opening in the encasement shell, whereupon the first and second personal computer drive bay peripherals are situated in substantially spaced parallel relation in the cavity, wherein the first and second personal computer drive bay peripherals perform different functions.

* * * * *